United States Patent
Chandler et al.

(10) Patent No.: US 6,889,498 B1
(45) Date of Patent: May 10, 2005

(54) EMISSIONS CONTROL

(75) Inventors: Guy Richard Chandler, Little Eversden (GB); Martyn Vincent Twigg, Caxton (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/623,447

(22) PCT Filed: Mar. 3, 1999

(86) PCT No.: PCT/GB99/00626
§ 371 (c)(1),
(2), (4) Date: Dec. 13, 2000

(87) PCT Pub. No.: WO99/44725
PCT Pub. Date: Sep. 10, 1999

(30) Foreign Application Priority Data

Mar. 6, 1998 (GB) .............................. 9804739

(51) Int. Cl.[7] .............................................. F01N 3/02
(52) U.S. Cl. ............................ 60/311; 60/274; 60/288
(58) Field of Search .......................... 60/295, 297, 311, 60/287, 288; 423/213.7; 55/DIG. 30

(56) References Cited

U.S. PATENT DOCUMENTS

| 4,535,588 | A | * | 8/1985 | Sato et al. ...................... 60/286 |
| 4,538,411 | A | * | 9/1985 | Wade et al. .................... 55/283 |
| 4,686,827 | A | | 8/1987 | Wade et al. |
| 4,813,231 | A | * | 3/1989 | Bykowski ..................... 60/274 |
| 4,923,487 | A | * | 5/1990 | Bogart et al. .................. 55/482 |
| 4,934,142 | A | * | 6/1990 | Hayashi et al. ................ 55/283 |
| 5,121,601 | A | * | 6/1992 | Kammel ........................ 60/275 |
| 5,458,664 | A | * | 10/1995 | Ishii et al. ..................... 55/282 |
| 5,551,231 | A | * | 9/1996 | Tanaka et al. ................. 60/289 |
| 5,571,298 | A | * | 11/1996 | Buck .......................... 55/282.3 |
| 5,651,250 | A | * | 7/1997 | Kawamura ................... 55/312 |
| 5,746,989 | A | | 5/1998 | Murachi et al. |
| 6,294,141 | B1 | * | 9/2001 | Twigg et al. ............. 423/213.7 |

FOREIGN PATENT DOCUMENTS

| DE | 33 37 903 A1 | 5/1985 |
| DE | 33 37 903 | 5/1985 |
| EP | 0 341 832 | 11/1989 |
| EP | 0 758 713 | 2/1997 |
| EP | 0 758 713 B1 | 5/2001 |
| JP | 64-8311 | 1/1989 |

OTHER PUBLICATIONS

British Shearch Report for corresponding UK application 9804739.2, dated Jul. 7, 1998.
PCT International Search Report for corresponding PCT application PCT/GB99/00626, Search dated Jun. 8, 1999.

* cited by examiner

Primary Examiner—Thomas Denion
Assistant Examiner—Diem Tran
(74) Attorney, Agent, or Firm—RatnerPrestia

(57) ABSTRACT

A cost-effective solution to removing particulates from diesel, especially light-duty diesel engines incorporates an oxidation catalyst (2) effective to convert NO in the exhaust from the engine to $NO_2$ and a particulate trap (4) which traps no more than 85% by weight of the particulate, optionally by permitting gas to by-pass the trap.

13 Claims, 2 Drawing Sheets

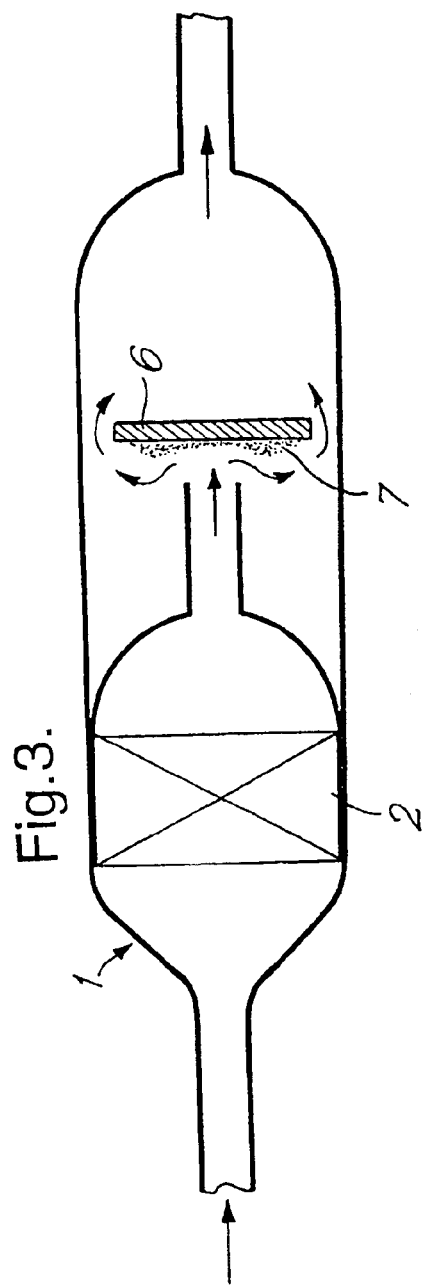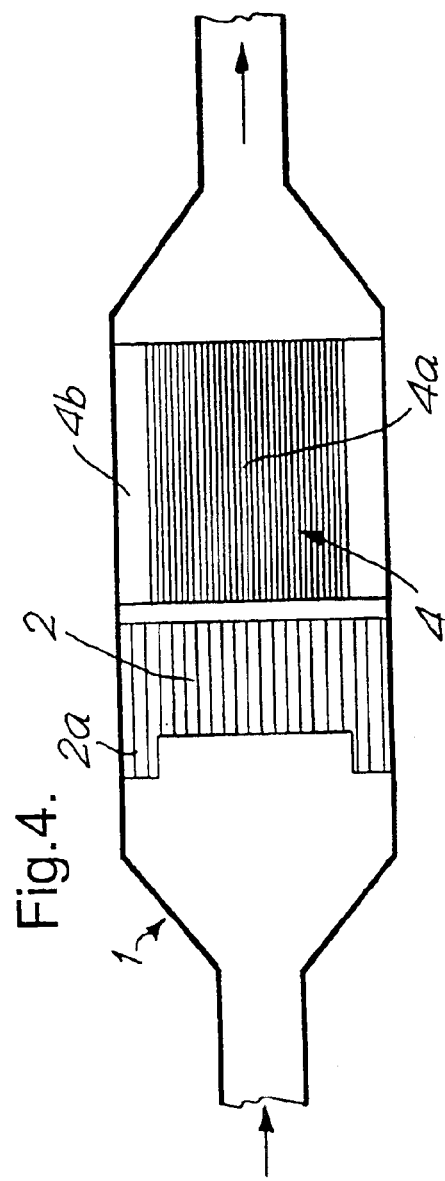

EMISSIONS CONTROL

This application is a U.S. National Phase application of PCT International Application No. PCT/GB99/00626.

The present invention concerns improvements in emission control, and more especially it concerns the control of emissions from diesel engines.

Diesel engines fall into two main categories, namely heavy duty, being principally large engines for trucks, buses and prime mover vehicle engines, ships and boats and stationary engines, and light duty engines, used in smaller trucks and cars. With the increasingly demanding regulation of emissions from all sorts of engines, attention is now being paid to control of emissions such as particulates and NOx from diesel engines. We have, in EP 341,832, described a device marketed as the Continuously Regenerating Trap ("CRT™") by Johnson Matthey. This device traps sooty particulates and causes their combustion by exposing them to $NO_2$ generally generated by catalytically oxidising NO present in the exhaust stream. This device has met with considerable success in controlling particulate emissions from heavy duty diesel engines, and can achieve zero emissions of particulate. That is, the CRT as marketed is approximately 100% effective to remove particulates (as defined in the regulations).

We have realised that a conventional CRT may not be cost-effective to control emissions to European Stage III, IV, or higher, regulations from light duty engines. A number of different options for controlling particulates and NOx are available, and engine manufacturers have hitherto favoured engine design and management solutions. In general, engine design itself can satisfy European Stage II emissions standards as regards NOx and particulates, but the characteristics of the diesel engine are such that engine design cannot improve upon about 0.4 g/Km particulates without a serious increase in NOx, which is difficult to deal with under lean conditions. There still remains, therefore, a need for effective systems to meet these emission regulations whilst increasing engine design options.

EP 0758713 (Toyota) describes an addition to the CRT principles, involving the absorption in a $NO_x$ absorbent of NO from gases leaving the CRT-type combination of oxidising catalyst diesel particulate filter or trap, formed by one of the reactions of $NO_2$ with carbon particles.

The present invention provides an emission control exhaust gas aftertreatment apparatus for diesel engines comprising a source of $NO_2$, especially an oxidation catalyst effective to convert a portion of NO in the exhaust gas from said diesel engine into $NO_2$, and a particulate trap characterised in that an exhaust gas by-pass is provided so that a portion of the exhaust gases do not pass through the trap, such that at most 85% by weight of total engine-out particulates are collected and combusted in the presence of said $NO_2$ in said trap. According to various embodiments of the present invention, the quantity of particulates collected and combusted may be at most 85%, 60% or at least 50% by weight. It is, however, important that all particulates collected are combusted (over several operating cycles, but not necessarily over a single operating cycle), in order to avoid accumulation and blocking of the filter. The presence of the by-pass alleviates build-up of back pressure with consequent degradation of engine performance.

The by-pass may permit a portion of the exhaust gases to escape the trapping means either continuously or when substantial trapping of unburnt particulates has occurred. Desirably, the trapping means is designed to be "fail-safe", that is whilst it is effective to capture 50 wt % or more of sooty particulates under normal conditions, the trapping means decreases its collecting efficiency whether by exhaust gases by-passing the trapping means or otherwise, if the collecting means becomes "saturated" or clogged up. This concept is, we believe, new in diesel exhaust treatment systems.

The invention accordingly provides a method of controlling emissions, especially particulate matter, from diesel engine exhaust gases by trapping and subsequently combusting said particulate matter, comprising trapping at most 85 wt % of particulate matter in the presence of $NO_2$, and causing a portion of said exhaust gases to by-pass said particulate trapping means.

The source of $NO_2$ is especially conveniently an oxidation catalyst of generally known type, capable of converting at least a portion of the NO contained in diesel exhaust gases into $NO_2$. However, the present invention includes within its scope variations including other sources of $NO_2$. Such sources could include compressed $NO_2$, other chemical sources which decompose or react, possibly over a catalyst, to yield $NO_2$, such as nitric acid, ammonia, urea, etc. The invention includes within its scope all ways of making $NO_2$ from the components of the exhaust gases. These may include: adding one or more catalytic components to the fuel, so that the components deposit on exhaust components including the filter; catalysing the filter or parts thereof with catalysts active at low temperatures to convert NO to $NO_2$; utilising a plasma to generate $NO_2$ by treatment of all or a portion of the exhaust gases, and other methods available to the skilled person.

In the invention, the particulate trap, or trapping means, is designed to be less than 100% effective, and desirably this brings several advantages, the first of which is considerably reduced back pressure. Light duty diesels are very much less capable of coping with back pressure from exhaust gas systems than heavy duty diesels, because they tend to be of smaller capacity and power, and in extreme cases the engine can be ruined.

The present invention is also intended to cater for some of the problems that can arise in practical usage of light duty diesels. If such engines are used in small cars or vans which are used at low speeds in towns for large portions of their operations, the exhaust gas temperature tends to be quite low, perhaps not more than 100–120° C. Under these conditions, although sooty particulates are generated in less quantities than under heavy load, the temperature is below that for the most efficient oxidation of NO to $NO_2$ and hence there can be insufficient $NO_2$, or the reaction temperature is too low for effective combustion of the sooty particles. Accordingly, for many vehicles for much of the time, the trapping means should collect sufficient of the particles to meet the emission regulations, but using a design that collects such particulates for subsequent combustion when conditions are improved, and permits the exhaust gas to pass through without excessive back pressure. In such systems, at least 50 wt % of particulate matter is trapped and subsequently combusted when operating conditions in the same or subsequent operating cycles are improved.

It will be recognised that the prime purpose of the invention is to remove a proportion only of the particulates from the exhaust gas stream. This is intended to be adequate to meet the appropriate emission regulation when combined with engine design and management improvements. The reduced efficiency in collection of particulates of the present invention brings about a significant reduction of cost, however, from a reduced volume and weight for both the catalyst and the trap compared to the state of the art CRT designed for such an engine.

The oxidation catalyst may be any that is effective to convert sufficient NO to $NO_2$, and is suitably a high platinum loading catalyst carried on a ceramic or metal honeycomb catalyst support. It is envisaged that in addition to reducing volume and weight of the catalyst, savings may be made in precious metal loading, thus reducing the cost yet further.

The particulate trap may suitably be a woven or knitted wire mesh or perforated metal or a suitable ceramic material. Preferred traps include especially those known as wall flow filters. The trap is suitably designed for each individual engine design, because the particulate emissions differ significantly from engine to engine. The trap may, but need not, carry a catalytic coating intended to initiate combustion at lower temperatures.

Continuing development of the inventive concept of the present invention has led to studies of flow and pressure patterns within such exhaust treatment systems. A further embodiment of the invention, in which the trap has peripheral bypass through which the exhaust gases flow only when the central portion of the trap becomes blocked, is particularly preferred. The flow of the gases can be directed to the central portion by a variety of means, including particularly baffle plates or cones, metal lips and the like, but we have found that extending the catalyst in the peripheral area is particularly simple and effective to reduce gas flow rates in that region.

A preferred embodiment of the present invention combines the emission control system with NOx control means. The NOx control may be achieved in a number of ways including exhaust gas recirculation, using a NOx conversion catalyst downstream of the trap or, more preferably, combining the trap system with a NOx absorbent. Such NOx absorbents are known to those skilled in the art and may utilise an alkaline earth metal oxide such as baria or calcia or other suitable materials. Together with the trap system of the present invention, such an absorbent can permit extremely useful control of emissions, for example up to about 80% removal of particulates combined with up to about 80% removal of NOx. The NOx trap is desirably a single through-flow canister, which may be regenerated by periodic enrichment of the exhaust gas in a number of ways. In an even more preferred embodiment, the trap system of the invention is combined with a lean-NOx catalyst and a NOx trap. A particularly desirable embodiment is where the NOx trap is effective to trap the NOx at low temperatures and releases NOx at higher temperatures, eg about 250° C., at which temperatures NOx may more readily be converted and/or used in the particulate combustion of the present invention.

When using the presently-preferred platinum-based catalyst, the present invention should be us ed with fuel of not more than 50 ppm sulphur, and preferably below 50 ppm sulphur, more preferably below 10 ppm sulphur. Other catalyst systems may have a wider range of fuel sulphur levels.

The invention may be better appreciated by reference to the accompanying drawings, in which:

FIG. 3 is a schematic cross-section of a further embodiment of the invention, and FIG. 4 is a schematic cross-section of a yet further embodiment.

Figure 1:
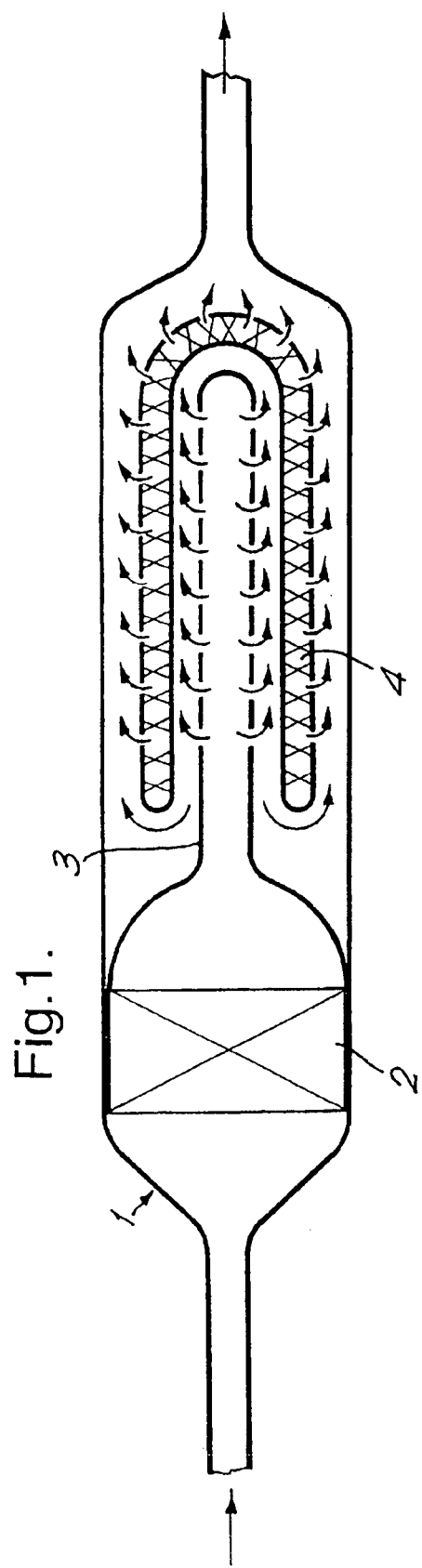
FIG. 1 is a schematic cross-section of a first embodiment of the invention.

Referring to FIG. 1, a canister is to be mounted in the exhaust system of a light duty diesel, eg a 1.9 litre Tdi engine. The canister, 1, contains an oxidation catalyst, 2, which is a platinum catalyst carried on a 100 cells/sq in metal honeycomb substrate. Particulate passes through the catalyst. A perforated gas distributor, 3, is mounted downstream of the catalyst, and surrounding the gas distributor is a sintered stainless steel filter, 4, which is located centrally within the canister. It can be seen that it is possible for the exhaust gases to by-pass the filter if the filter becomes clogged. Under ideal conditions, the filter collects sooty particles which are continuously combusted in the $NO_2$ generated by the catalyst, according to one or more of the equations:

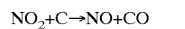

$NO_2 + C \rightarrow NO + CO$

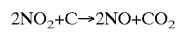

$2NO_2 + C \rightarrow 2NO + CO_2$ $2NO_2 + 2C \rightarrow N_2 + 2CO_2$

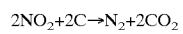
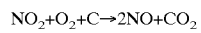

$NO_2 + O_2 + C \rightarrow 2NO + CO_2$

Under non-ideal conditions, that is at low exhaust gas temperatures, a portion only of the particulate is collected in the filter, and most of the exhaust gas by-passes the filter. Returning to higher exhaust gas temperatures permits the combustion reaction to re-start and the particulate can be totally removed from the filter.

Figure 2:
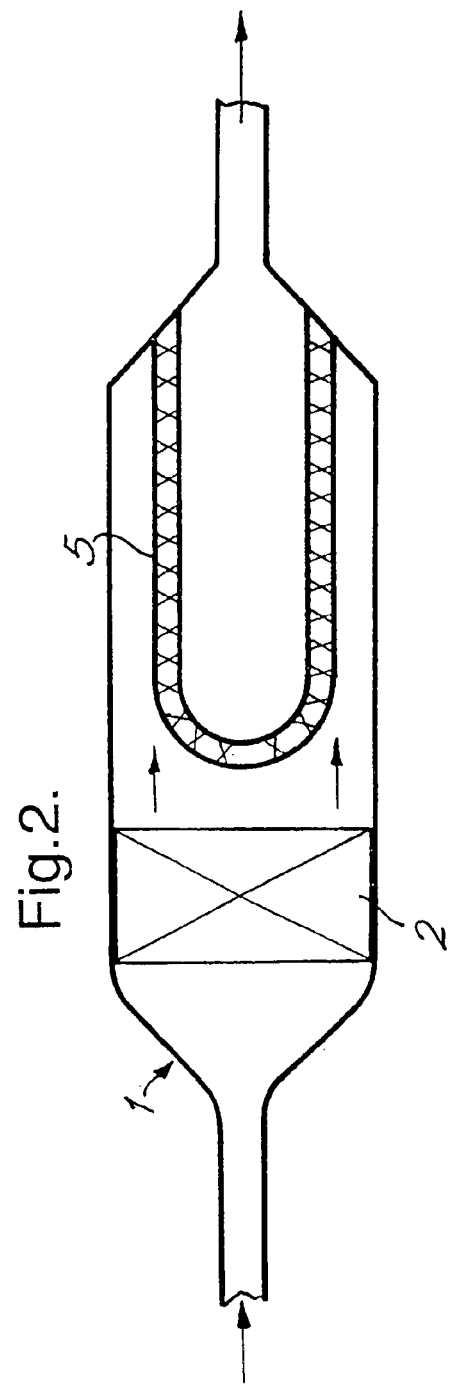
FIG. 2 is a schematic cross-section of a second embodiment of the invention.

Referring to FIG. 2, an embodiment is shown which permits substantial accumulation of particulate without by-pass, but using a filter, 5, which is not 100% effective. The same items as in FIG. 1 are identified using the identical reference numerals. There is sufficient capacity to accumulate particulate under all normal operating conditions.

FIG. 3 utilises a slightly different by-pass design to that of the embodiment of FIG. 1. The particulate is collected by impingement on a baffle plate, 6, and is shown by mass, 7. The baffle plate is itself preferably porous to gas and acts as a filter. As exhaust gas temperatures rise, the hot gases immediately contact the collected particulate and quickly cause combustion. This design may comprise electrical heating of the collection area on plate 6, creating a hot spot to initiate combustion. In a further design variation the baffle plate may comprise upstanding walls, giving a U-shaped cross-section.

A preferred embodiment is illustrated in FIG. 4. Engine exhaust gas passes through catalyst 2, which is provided with a peripheral lip 2a. The resulting increased resistance to flow in the peripheral region causes the majority of the gases to flow through the central, filtering, region of trap 4, (4a) rather than through the open peripheral bypass region (4b). Thus under normal operating conditions, negligible quantities of the exhaust gases bypass the filter, but if the filter becomes blocked with particulate, the system is fail-safe and the gases bypass the filter. Surprisingly low back pressures result from this system.

The above FIG. 4 embodiment was tested fitted to a commercially available 1.9 litre Tdi car designed to meet European Stage II standards. After 1,000 road miles, the embodiment was tested according to the European Stage III test protocol. The following test results were obtained:

|  | HC (g/Km) | CO (g/Km) | NO$_x$ (g/Km) | PM (g/Km) |
|---|---|---|---|---|
| Engine-out exhaust gas | 0.21 | 0.69 | 0.65 | 0.10 |
| With FIG. 4 by-pass filter | 0.02 | 0.03 | 0.62 | 0.02 |

It is to be noted that these results meet Stag IV requirements also, with the exception of NO$_x$. However, established engine design/management techniques can be used to lower NO$_x$ emissions to Stage IV levels, with a consequent increase in Particulate Matter, but the system of the invention is capable of dealing with such emissions.

It will be appreciated that there are many possibilities to vary the designs shown herein without departing from the principles of the present invention.

What is claimed is:

1. An emission control exhaust gas aftertreatment apparatus for exhaust gases from diesel engines comprising a source of NO$_2$, a wall flow filter, means for directing flow of gases to a central portion of the filter, and an exhaust gas by-pass effective under all operating conditions, wherein a portion of the exhaust gases do not pass through the filter, such that up to 85 wt % of engine-out particulates are collected on the filter and combusted In the presence of said NO$_2$ in the filter.

2. An apparatus according to claim 1, wherein the source of NO$_2$ is a catalyst which is effective to convert at least a portion of NO in exhaust gases to NO$_2$.

3. An apparatus according to claim 2, wherein the exhaust gases pass through the catalyst before passing through the filter.

4. An apparatus according to claim 1 further comprising a NO$_x$ control means.

5. An apparatus according to claim 4, wherein said NO$_x$ control means is a NO$_x$ absorbent.

6. An apparatus according to claim 1, wherein the wall flow filter has peripheral regions that define the by-pass.

7. An apparatus according to claim 1 further comprising a catalyst carried by the wall flow filter.

8. An apparatus according to claim 1, wherein the filter is effective to trap about 50 wt % or more of engine-out particulates.

9. A method of controlling emissions from diesel engine exhaust gases by trapping and subsequently combusting particulate matter, the method comprising the steps of directing the flow of gases to a central portion of a particulate filter, trapping up to 85 wt % of particulate matter in the exhaust gas in the particulate filter, combusting the trapped particulate matter in the presence of NO$_2$, and causing a portion of said exhaust gases to by-pass the particulate filter under all operating conditions.

10. A method according to claim 9, wherein the trapping step comprises trapping about 50 wt % or more of particulate matter in the exhaust in the particulate filter.

11. An emission control exhaust gas aftertreatment apparatus for exhaust gases from light duty diesel engines comprising a source of NO$_2$, a wall flow filter, means for directing flow of gases to a central portion of the filter, and an exhaust gas by-pass effective under all operating conditions, wherein a portion of the exhaust gases do not pass through the filter, such that up to 85 wt % of engine-out particulates are collected on the filter and combusted in the presence of said NO$_2$ in the filter.

12. An apparatus according to claim 11, wherein the source of NO$_2$ is a catalyst which is effective to convert at least a portion of the NO in the exhaust gases to NO$_2$.

13. An emission control exhaust gas aftertreatment apparatus according to claim 11, wherein about 50 wt % or more of engine-out particulates are collected on the filter.

* * * * *